March 7, 1961 L. F. ROWE ET AL 2,973,683
DICHROIC MIRROR ASSEMBLY
Filed Aug. 12, 1957 5 Sheets-Sheet 1

INVENTORS
LOUIS F. ROWE
MERTON L. SMITH
BY OSCAR W. DILLON

ATTORNEY

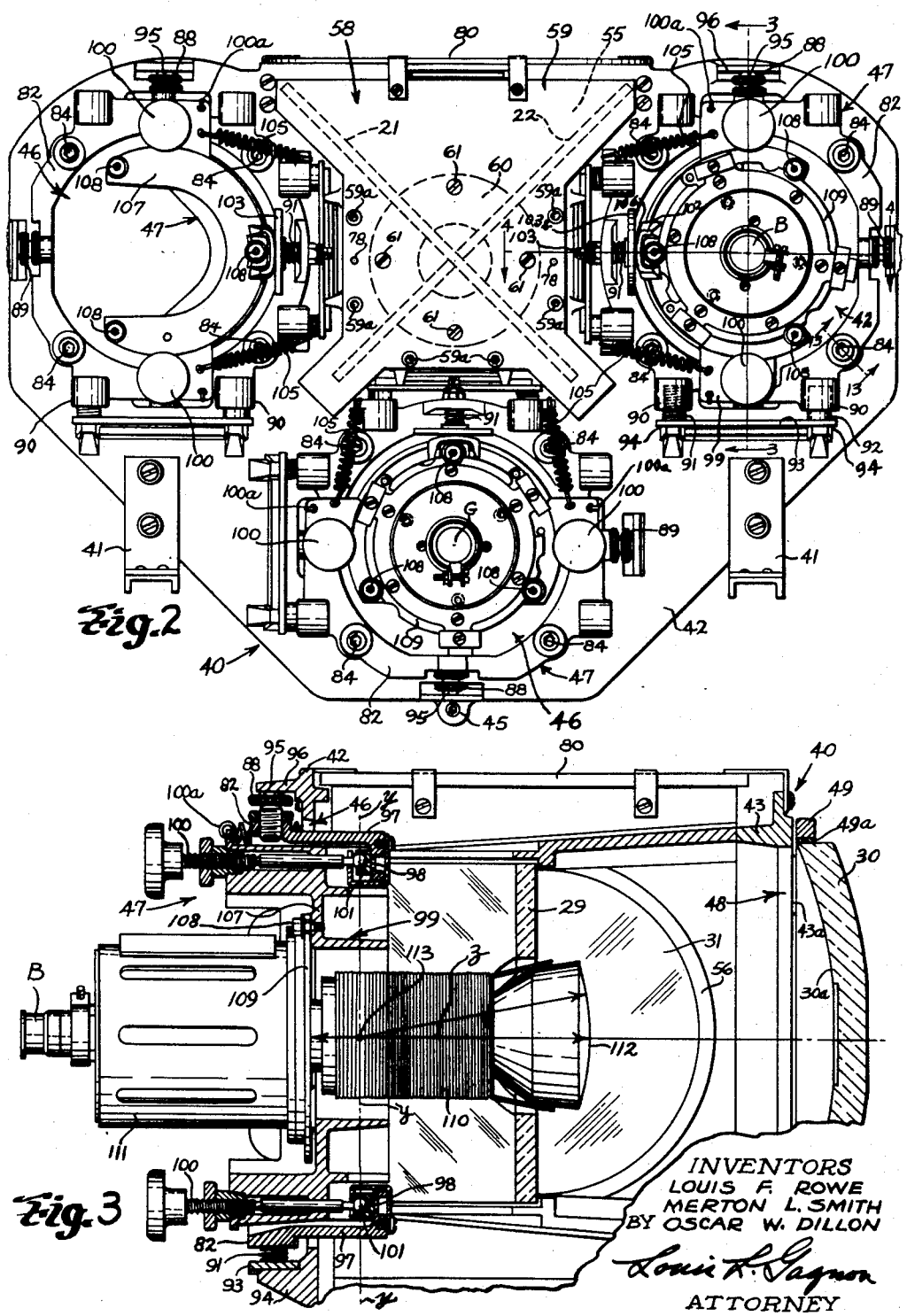

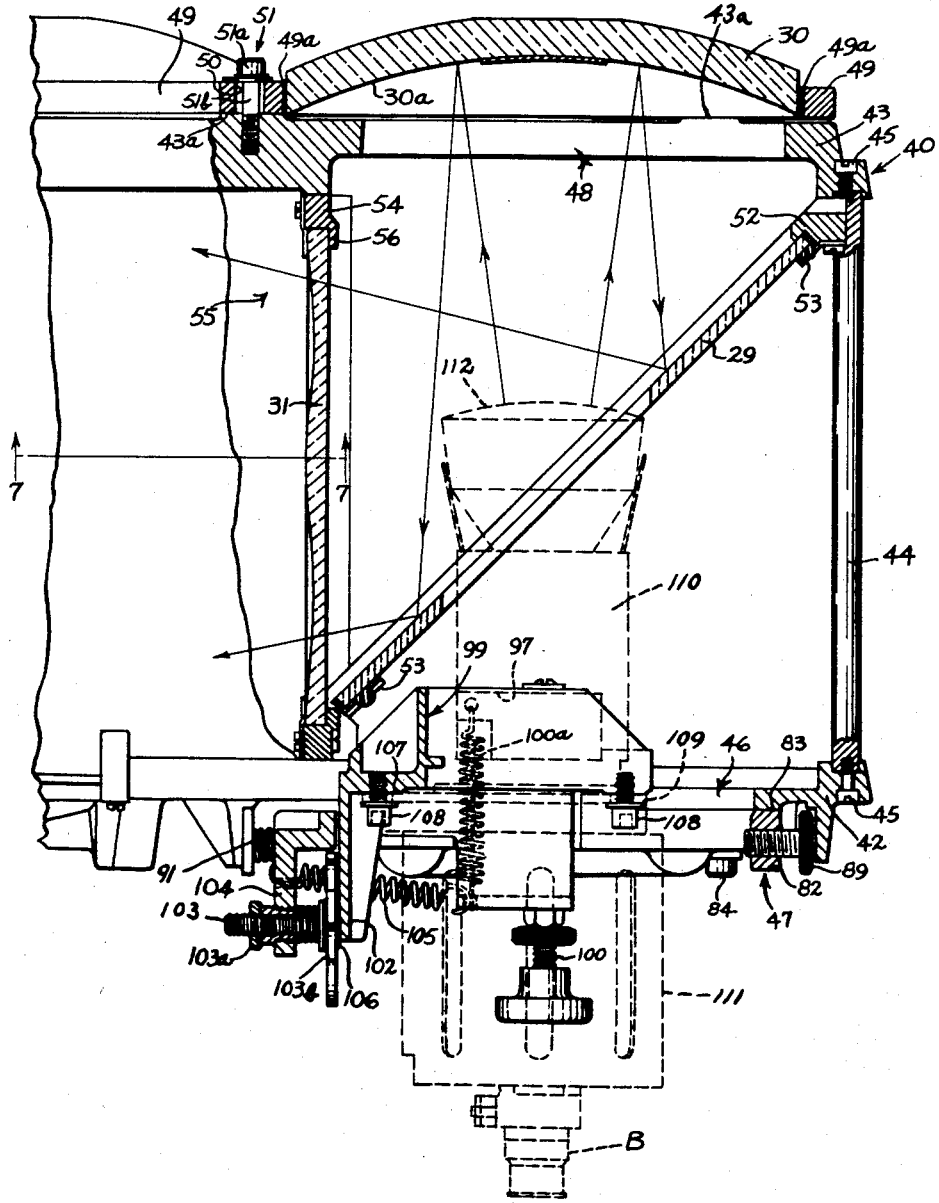

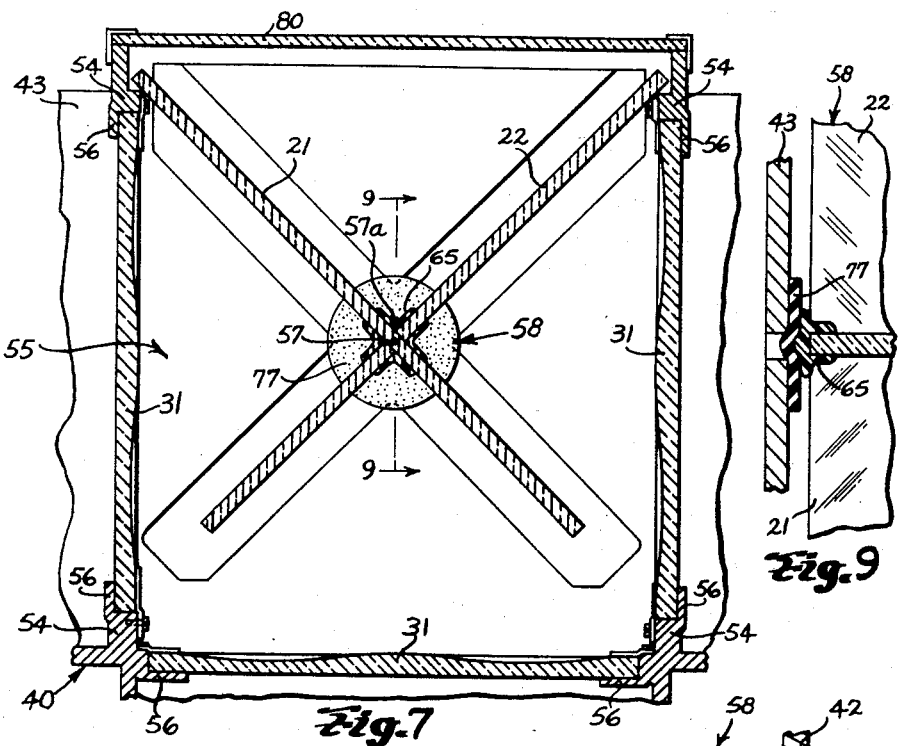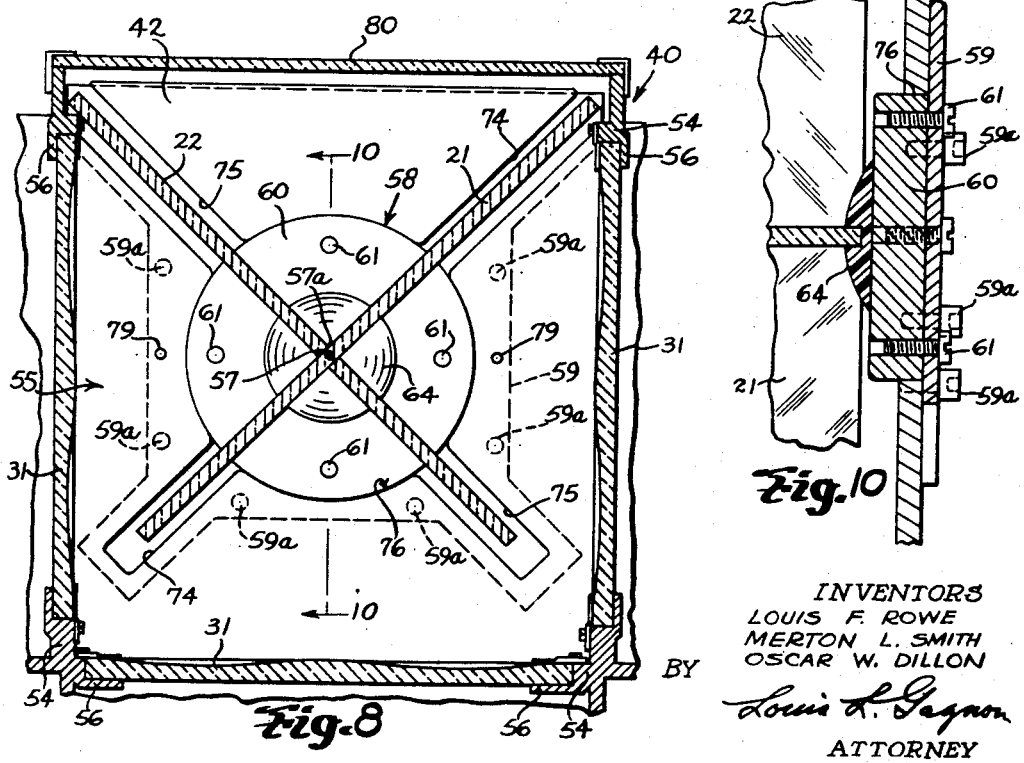

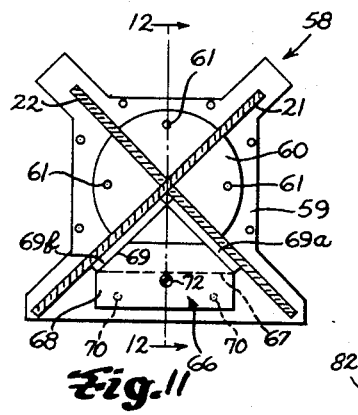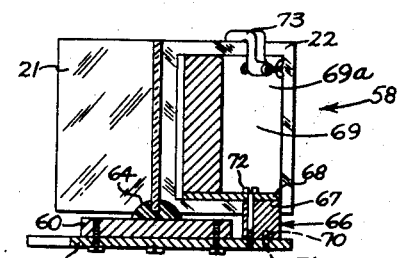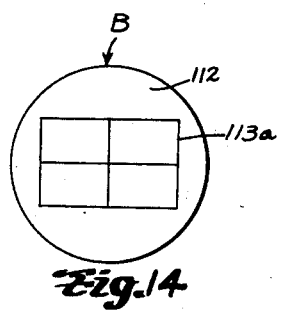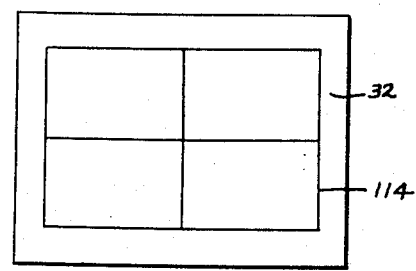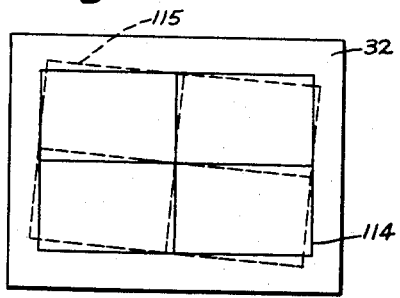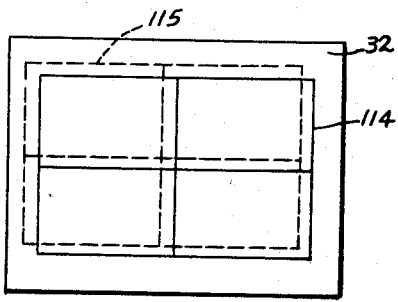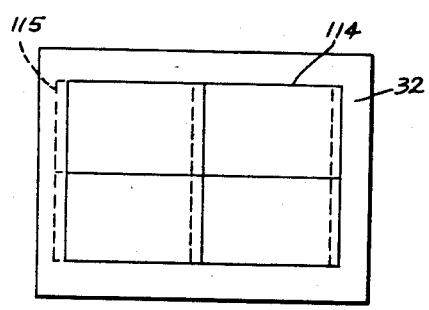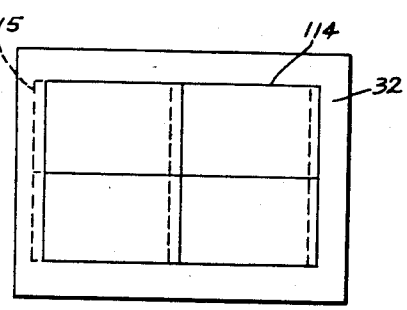

United States Patent Office 2,973,683
Patented Mar. 7, 1961

2,973,683

DICHROIC MIRROR ASSEMBLY

Louis F. Rowe, North Woodstock, and Merton L. Smith, Woodstock, Conn., and Oscar W. Dillon, Sturbridge, Mass., assignors to American Optical Company, Southbridge, Mass., a voluntary association of Massachusetts Filed Aug. 12, 1957, Ser. No. 677,648

3 Claims. (Cl. 88—1)

This invention relates to television image reproducing apparatus for projecting multiple images and has particular reference to improved means and method for arranging and aligning the component parts of said image reproducing apparatus to produce an accurate register of the multiple images.

A principal object of the present invention is the provision of novel means and method for assembling and aligning a plurality of optical projection elements in an image reproducing apparatus for projecting multiple images to provide an accurate superpositioning and registry of a plurality of images projected thereby on a viewing surface.

Another object is to provide in a multiple image projection device of the above character, improved mounting means for supporting a plurality of reflective optical elements in axially aligned relation with a common projection axis to produce an accurate registry of a plurality of reflectively projected images at a remote viewing screen.

Another object is to provide a common mounting means for accurately supporting the combination of a plurality of reflective optical projection systems and a removable color selective light reflecting means, which mounting means protects all of the optically active surfaces of the projection systems and color selective means by providing an enclosure for the same.

Another object is to provide novel means and method for aligning and mounting a color selective light splitting means as a removable sub-assembly in a housing having a plurality of reflective optical projection units therein whereby images projected by said units will be superposed in precise registry with each other by said light splitting means.

Another object is to provide separate mounting means for assembling and supporting a color selective light reflecting unit of the crossed dichroic mirror type which may be readily inserted into or removed from a projection device of the above character whereby cleaning or replacement of said dichroic mirrors may be accomplished without disrupting the aligned relation of the parts of said projection device.

Another object is the provision of novel means for assembling and aligning a pair of light reflecting means in interfitting crossed relation with each other whereby each of said reflecting means is maintained as a single unitary part and thus is disposed in a single optical plane.

Another object is to provide a relatively simple, compact and efficient multiple image projection means more particularly, but not exclusively, for use in color television receivers of the projection type wherein said apparatus embodies a common housing means in which a plurality of reflective optical projection systems and a removable color selective light separating and directing means are supported in precise optical alignment with each other for accurately superimposing differently colored monochromatic images projected by said systems.

A further object is to provide, in combination with the above, improved adjustable mounting means for rigidly supporting and accurately aligning each of a plurality of kinescopes relative to certain projection axes in multiple image projection means of the character described wherein the inherent physical and electrical variations of said different kinescopes may be readily compensated for to cause the images produced thereby to be projected in precisely registered superposed relation with each other by said projection means.

Other objects and advantages of the invention will become apparent from the following description when taken in conjunction with the accompanying drawings, in which:

Fig. 2 is a side elevational view of the multiple image projection unit embodying the invention;

Fig. 3 is a fragmentary vertical cross-sectional view taken substantially on line 3—3 of Fig. 2 looking in the direction indicated by the arrows;

Fig. 4 is a fragmentary horizontal cross-sectional view taken substantially on line 4—4 of Fig. 3 looking in the direction indicated by the arrows;

Fig. 7 is a fragmentary vertical cross-sectional view of the color selective light directing means of the device of the invention and its adjacent associated parts taken at a position through said device substantially as indicated by line 7—7 of Fig. 4 and looking in the direction of the arrows;

Fig. 8 is a fragmentary view generally similar to Fig. 7 taken at the same position on Fig. 4 but looking in a direction opposite to that indicated by the arrows of line 7—7 thereof;

Fig. 9 is a fragmentary cross-sectional view taken substantially on line 9—9 of Fig. 7;

Fig. 10 is a cross-sectional view taken substantially on line 10—10 of Fig. 8;

Fig. 11 is a top plan view of the sub-assembly shown in Fig. 6 and further illustrating means for aligning the dichroic mirror elements thereon;

Fig. 12 is a cross-sectional view taken substantially on line 12—12 of Fig. 11;

Fig. 13 is a fragmentary cross-sectional view taken on line 13—13 of Fig. 2;

Fig. 14 is a plan view of the face portion of one of the kinescopes of the device; and Figs. 15–18 are diagrammatic illustrations of a screen and target means used to align the kinescopes of the device of the invention.

Figure 1:
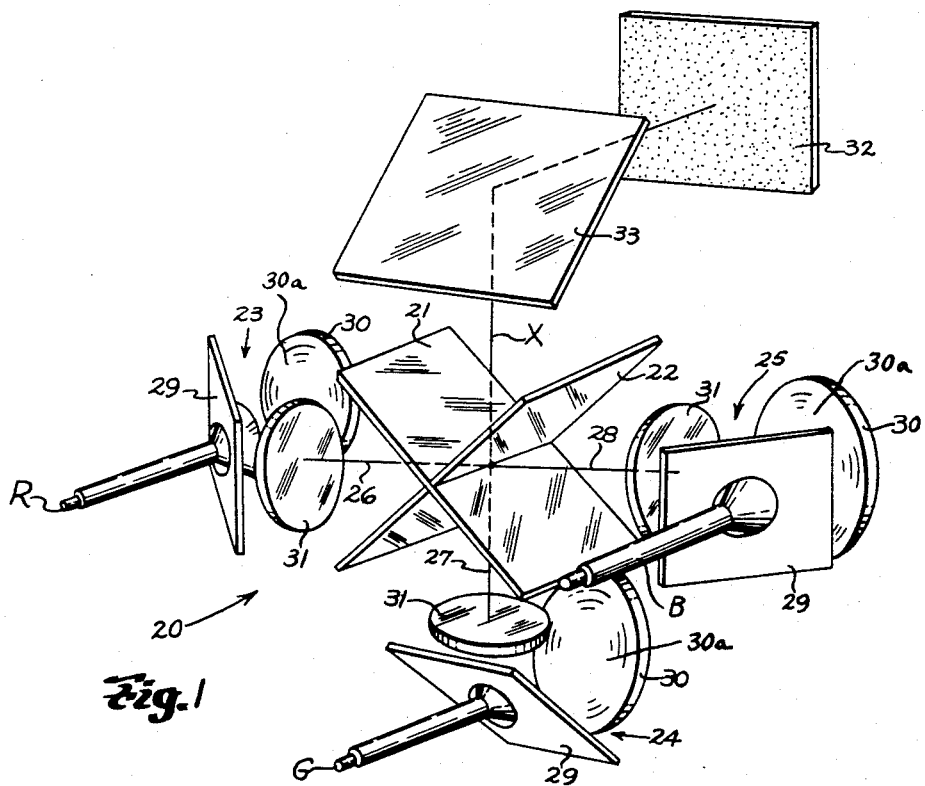
Fig. 1 is a diagrammatic illustration of the optical projection system of the device of the invention.

Referring more particularly to the drawings wherein like characters of reference designate like parts throughout the several views thereof, the device of the invention comprises multiple image projection means 20 for use in color television receivers. An illustration of the related positions of the optical projection elements of said device is diagrammatically shown in Fig. 1.

The projection means 20 of the invention is readily adaptable to any of the conventional television receiver systems either of the well known sequential or the more common simultaneous types. While projection means 20 employs the use of three individual kinescopes R, G and B (Fig. 1) which are each adapted to produce a differently colored monochromatic image on their luminous face portions, the operation of said kinescopes R, G and B is strictly conventional and forms no part of the present invention. Therefore, the disclosure herein will be directed only to the projection apparatus illustrated in the drawings, it being understood that any well known and conventional means may be operatively associated with kinescopes R, G and B to properly energize the same.

In general, the optical projection means 20 of the invention (Fig. 1) comprises a pair of intersecting plane dichroic mirrors 21 and 22 disposed perpendicular to each other and a plurality of adjacent folded projection units 23, 24 and 25 of the Schmidt-type, having their optical projection axes 26, 27 and 28 aligned to substantially intersect the axis of intersection of mirrors 21 and 22 while being disposed in a substantially 45° angular relation with the planes of each of said dichroic mirrors 21 and 22. Each of the units 23, 24 and 25 embodies an apertured plane mirror 29 through which the enlarged head part of a respective kinescope R, G or B extends, and mirrors 29 are each disposed at an angle of substantially 45° to the longitudinal axes of their respective kinescopes. A concave spherical mirror 30 is positioned in facing relation with each of the kinescopes so as to have the general plane of its curvature aligned in substantially normal relation to the longitudinal axis of said kinescope and a correcting lens or plate 31 having an aspheric curvature on at least one side thereof is located adjacent the dichroic mirrors 21 and 22 with its general plane disposed in a substantially 90° angular relation with the mentioned plane of mirror 30.

The dichroic mirrors 21 and 22 are conventional in function and operate in the well known manner to selectively transmit or reflect light projected thereto in accordance with the color characteristics thereof. In the present instance, the dichroism of mirrors 21 and 22 is such as to cause mirror 21 to transmit red and green light and reflect blue light while mirror 22 will transmit blue and green light and reflect red light. Therefore, it can be seen that by providing a red phosphor on the face of kinescope R, a green phosphor on the face of kinescope G and a blue phosphor on the face of kinescope B, the red image forming light from the luminous face portion of tube R, when in operation, will be projected through corrector plate 31 of unit 23 and transmitted through mirror 21 to be reflected by mirror 22 in an upward direction along paths parallel to axis X (Fig. 1). In a similar manner, the blue image forming light from kinescope B will be projected through its respective corrector plate 31, transmitted through mirror 22 and reflected upwardly by mirror 21 also along paths parallel to axis X while the green image forming light from kinescope G will be directed through its respective corrector plate 31 upwardly through both of the mirrors 21 and 22 along paths parallel to axis X.

With the three kinescopes R, G and B properly energized to each produce their respectively colored image components, which colors are the primary components for a tricolor system, the combined images projected along axis X will produce by the additive process a composite fully colored image when received on a suitable viewing screen or the like 32. A plane mirror 33 is illustrated in Fig. 1 to direct the light passing in the direction of axis X to said viewing screen 32.

While there have been numerous color projection systems of the above described general type embodying crossed dichroic mirrors, considerable difficulty has been encountered heretofore in producing and maintaining a precise registry and superpositioning of the individual colored images and thus the composite colored images have been lacking in definition and color balance. This difficulty has been largely due to the fact that improper aligning techniques and inferior mounting means have been used to align and support the various optical elements in their required optically aligned relation with each other.

Since the alignment of the optical projection elements relative to each other is extremely critical, this invention is directed more particularly to improved means and method for aligning and permanently maintaining the aligned relation of the optical projection elements in a device of the above described character.

Accordingly, a common housing means 40 (Figs. 2–10) is provided to support all of the optical projection elements shown in Fig. 1 with the exception of the screen 32 and mirror 33 which parts are shown merely to illustrate a means for receiving a composite image directed along axis X.

Housing 40 is adapted to be mounted in a television receiver cabinet or the like by means of brackets 41 (Fig. 2) and said housing comprises front and back walls 42 and 43 respectively which are preferably cast or otherwise efficiently formed of a suitable metal such as aluminum or the like which is not readily distortable by the normal changes in temperature which are brought on by the operation of the kinescopes or other adjacent receiver equipment within a television cabinet and which further greatly reduces the overall weight of the composite structure of the projection apparatus. Walls 42 and 43 are spaced in substantially parallel relation with each other by means of a plurality of spanner members 44 which are secured to each of said walls by screws or the like 45 as shown more particularly in Figs. 2 and 4.

Wall 42 is provided with a plurality of apertures 46 each having an adjustable fixture 47 mounted thereover for supporting and aligning an individual one of the kinescopes R, G and B and wall 43 is provided with circular apertures 48 which are in substantially aligned facing relation with apertures 46 (Figs. 3 and 4). One of the concave spherical mirrors 30 is adjustably mounted over each of the apertures 48 in the manner shown more particularly in Figs. 3 and 4 wherein an annular collar 49 is provided about the outer edge portion of mirror 30 (Figs. 3 and 4). A filler of adhesive material or any other suitable connecting means 49a is provided between collar 49 and mirror 30 to secure mirror 30 in a position of use with collar 49. Collar 49 is provided with a plurality of apertures 50 through each of which is extended a clamping screw 51. Screw 51 is threadedly engaged in the back wall 43 of housing 40 and is provided with an enlarged head portion 51a adapted to overlie the aperture 50 while having a body part 51b of a diameter substantially less than that of the diameter of aperture 50. Each of the collars 49 rests on accurately machined bosses 43a of back wall 43 and it can be seen that by loosening screws 51, the mirrors 30 and collar 49 assemblies may be adjusted laterally on bosses 43a. The adjustment of mirrors 30 will be discussed in greater detail hereinafter when a description of the procedure used to align the optical elements of the device will be given.

In each of the spaces between the fixtures 47 and mirrors 30, there is provided one of the apertured plane mirrors 29 (Figs. 3 and 4) and a diagonally extending supporting framework 52 interconnecting the walls 42 and 43 for supporting said mirror 29. Mirrors 29 are held in fixed relation with their respective frames 52 by means of clamps 53 and are each disposed at a related angle of substantially 45° to the general plane of the surfaces 30a of their respective mirrors 30. An apertured partition 54 is provided between the walls 42 and 43 adjacent each of the innermost ends of mirrors 29 and each of the partitions 54 are joined at their meeting edge parts to form a three sided substantially rectangular box-like enclosure 55 centrally of housing 40 having its open end adjacent the upper side of the housing 40. An annular flanged seat 56 is provided about each of the apertures in walls 54 and a corrector plate 31 is placed in engaging relation with each of the flanged seats 56. The planes of the seats 56 are controlled to lie in planes substantially normally related to the general plane of the finished surface 30a of their adjacent mirrors 30 and the apertures in partitions 54 are aligned relative to each other so as to cause their axes to intersect each other substantially at a common point 57 (Figs. 7 and 8) within enclosure 55. Furthermore, the diameters of the apertures in partitions 54 are controlled to be substantially equal to the outer diameters of corrector lenses 31. Corrector lenses 31 are manufactured by any well known method in such a manner as to have their geometrical centers in coincidence with their optical centers or within extremely close tolerable limits such as for example, 0.010 of an inch. Therefore, when fitted into the apertures of partitions 54, the optical axes of corrector lenses 31 will substantially intersect each other at the previously mentioned common point 57 within enclosure 55.

The dichroic mirrors 21 and 22 are mounted as a separate and removable sub-assembly 58 (Fig. 6) and positioned within the enclosure 55 of housing 40 so as to have their uppermost apex of intersection 57a disposed substantially optically coincident with the above mentioned common point of intersection 57 of the optical axes of corrector lenses 31 allowing for the thickness of the glass of which the mirrors 21 and 22 are made, as shown more particularly in Figs. 7 and 8.

In order to bring about the optical coincidence of the apex of intersection 57a with the point of intersection 57 of the optical axes of the corrector lenses, the dichroic mirrors 21 and 22 are constructed of a glass having an index of refraction of 1.53 and have a thickness of .250 inch and in accordance with these values the upper apex is offset .085 inch above the point of intersection 57 which is the amount necessary to cause the apex 57a to be optically coincident with the intersection 57. If the mirrors 21 and 22 are constructed of glass differing in index of refraction and thickness from the example given above, the distance between the point of intersection 57 and the apex 57a will be altered accordingly.

The dichroic mirror sub-assembly 58 comprises a mounting plate 59 having a cylindrically contoured platform 60 secured thereto by screws or the like 61 upon which is mounted the dichroic mirrors 21 and 22. Mirrors 21 and 22 are each provided with a transverse slot 62 and 63 respectively (Fig. 5) which extend substantially throughout one-half of their width. Slots 62 and 63 are preferably controlled to be of a width substantially that of the thickness of said mirrors to provide a close fitting structure when said mirrors are assembled. Mirrors 21 and 22 are asembled by simply interfitting the unslotted portion of each of said mirrors into the slotted portions thereof in the so called "eggcrate" fashion. In so doing it can be seen that the dichroic mirror assembly will produce a crossed light spitting means formed of only two parts wherein the plane of each portion of a particular mirror 21 or 22 at opposite sides of their intersection, will not be out of line since said mirrors are each maintained as an integral unit although they are in crossed relation with each other.

When so assembled with each other, mirrors 21 and 22 are secured to platform 60 of the sub-assembly 58 by placing a relatively large gob of epoxy resin 64 or other initially soft but hard setting adhesive or other suitable connecting means of said platform and forcing the intersecting portions of one of the side edges of the mirror assembly into said resin. The epoxy resin, or the like, which is characteristically initially soft and pliable will fill in around the intersecting area of the mirror assembly substantially as shown in Figs. 6, 8 and 10 and will set and adhere most tenaciously to said mirrors and platform when air hardened or alternatively and more rapidly hardened by the application of heat thereto.

Figures 5, 6:
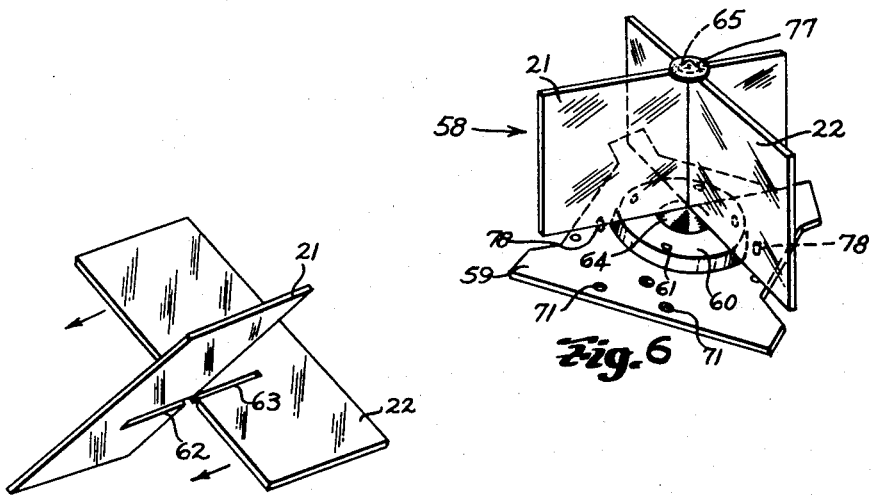
Fig. 5 is an exploded perspective view of a pair of dichroic mirror elements to be used in the device of the invention.
Fig. 6 is a perspective view of a sub-assembly of the projection device of the invention including the dichroic mirror elements.

To assist in rigidly supporting mirrors 21 and 22 a second gob of epoxy resin, or the like, 65 may be placed at the opposed intersecting side edge portions of mirrors 21 and 22 as shown more particularly in Figs. 6, 7 and 9.

The dichroic mirrors 21 and 22, however, must be assembled in precise 90° angular relation with each other so as to cause the planes of said mirrors 21 and 22, when positioned in housing 40, to each be angularly disposed in a substantially 45° relationship with the optical axes of each of the corrector lenses 31.

To insure a proper angular relationship of the crossed dichroic mirrors 21 and 22 relative to each other when mounting the same on platform 60 as described above, an aligning jig 66 is provided to hold said mirrors in 90° angular relationship with each other in the manner illustrated in Figs. 11 and 12. Jig 66 embodies a block 67 having a plate 68 and a V-shaped guide portion 69 welded thereto or otherwise securely mounted to form an integral structure. The underside of block 66 is provided with a pair of outwardly extending locating pins 70 which are adapted to snugly fit within a matching pair of openings 71 in the plate 59 (Figs. 6 and 12) and the jig 66 is removably attached to plate 59 by a stud 72. The V-shaped guide portion 69 of jig 66 is comprised of a pair of plates 69a and 69b accurately formed with the planes of their outer side surfaces disposed at a precise angle of 90° relative to each other and by clamping the mirrors 21 and 22 firmly against the guide portion 69 with any suitable clamping means such as 73 (Fig. 12) the mirrors 21 and 22 will be maintained in precise angularly aligned relation with each other during their assembly with platform 60. When the epoxy resin, or the like, 64 has hardened, clamps 73 and jig 66 are removed and the sub-assembly 58 of Fig. 6 is ready to be mounted in housing 40.

It can be seen that sub-assembly 58 provides a secure and permanent mounting means for mirrors 21 and 22 and since said mirrors are only supported at a location adjacent their intersection said mirrors are substantially strain free and are not subject to internal stresses which might damage or cause a cracking of said mirrors such as might be the case if they were rigidly mounted with clamps or secured to a mounting means along the entire length of their side edges.

In order to mount the sub-assembly 58 in housing 40, the side wall 42 thereof is provided with a pair of slots 74 and 75 (Fig. 8) which are in 90° angularly crossed relation with each other and communicating with enclosure 55. Slots 74 and 75 are of a width considerably greater than the thickness of mirrors 21 and 22 as is evident from Fig. 8 and an enlarged circular aperture 76 is provided through side wall 42 at the intersection of the axes of the slots 74 and 75 (Figs. 8 and 10). Aperture 76 is of a diameter substantially equal to the diameter of platform 60 of sub-assembly 58 whereby said platform 60 may be readily inserted into aperture 76 at which time the mirrors 21 and 22 will pass through slots 74 and 75 and be disposed within enclosure 55 of housing in the manner illustrated in Figs. 7-10.

A resilient pressure pad 77 of rubber or the like is placed between the wall 43 of housing 40 and the adjacent side intersecting portions of mirrors 21 and 22 to aid in supporting the overhang of said mirrors which extends outwardly from platform 60 (Figs. 6, 7 and 9). Plate 59 is then screwed to side wall 42 by studs or the like 59a. It is, however, important that the upwardly disposed apex of intersection of mirrors 21 and 22 be aligned in optically superposed relation with the common point of intersection 57 of the optical axes of corrector lenses 31 and to accomplish this, a pair of locating pins 78 are provided on the inner surface of plate 59 (Fig. 6) which are adapted to interfit with mating apertures 79 in the side wall 42 of housing 40. Locating pins 78 are so disposed relative to the apertures 71 in plate 59 that the location of jig 66 on plate 59, which is determined by the interfitting relation of its pins 70 in apertures 71, will position mirrors 21 and 22 in predetermined aligned relation with said locating pins 78 during the mounting of said mirrors on platform 60. When the pins 78 are fitted into openings 79 during the mounting of sub-assembly 58 on housing 40, the mirrors 21 and 22 will be automatically aligned with the above mentioned point of intersection 57 so as to have their upwardly directed apex 57a optically coincident with point 57 and their side surfaces accurately disposed at an angle of 45° relative to the optical axes of the corrector lens elements 31.

A transparent cover plate 80 is provided over the open upper end of enclosure 55 to completely enclose mirrors 21 and 22 and by providing a sealing layer of any well known gum-like material around the edges of the cover plate 80, the corrector lens elements 31 and the mounting plate 55, the enclosure 59 will be rendered dust proof. Nevertheless, if a cleaning of mirrors 21 and 22 or the adjacent surfaces of corrector lenses 31 is necessary, the dichroic mirror sub-assembly 58 may be readily removed from housing 40 by releasing studs or screws 59a.

It can be seen that mirrors 21 and 22 may be readily replaced when desired by removing same from platform 60 and mounting another pair thereon in accordance with the above teachings.

By providing a precisely and permanently optically aligned crossed dichroic mirror and corrector lens assembly in the above manner, the optical alignment of the remaining optical elements of the device with said assembly becomes extremely simple.

With the optical path length between the finished surface 30a of a mirror 30 and a respective correcting lens 31 being controlled to be substantially equal to the radius of curvature of surface 30a, it is only necessary to adjust mirror 30 laterally on the finished surfaces 43a of side wall 43 to optically align its optical axis with its respective correcting lens 31.

A simple procedure for optically aligning a lens 30 with its respective correcting lens 31 would be as follows:

A point source of light, not shown, is located substantially at the object plane of mirror 30 and in approximate alignment with the optical axis thereof (this location would be substantially at the ultimate location of the face portion of a kinescope which is to be used with the device). A suitable viewing screen such as screen 32 of Fig. 1 would then be located at the image plane of mirror 30, which image plane would be remote from the housing 40 and at a projection distance from mirror 30 equal to its focal length which of course is determined by the radius of curvature of surface 30a thereof. With the point source of light at the object plane of mirror 30, a point of light would be received at screen 32. However, by moving the point source of light forwardly or rearwardly of the object plane of mirror 30, a plurality of halations of light will be received at screen 32. These halations are caused by the aspheric curvature of corrector lens 31 and when they are formed concentrically with each other, the optical axes of said correcting lens 31 and spherical mirror 30 are in alignment with each other and the center of curvature of the mirror 30 will fall on the optical center of the corrector lens 31. Mirror 30 is accordingly adjusted on side wall 43 of housing 40 until the mentioned concentric halations of light are received at screen 32 and the screws 51 are tightened to lock said mirror 30 in its optically aligned relation with corrector lens 31. With all of the spherical mirrors aligned in this manner, all of the optical elements of the device of the invention will be in precise optical alignment with each other and with the crossed dichroic mirrors 21 and 22.

It is pointed out that with the above alignment procedure, precise positioning of the plane surface mirror 29 is not a critical factor since the above described adjustment of spherical mirror 30 will compensate for slight errors in the alignment of mirror 29. However, the plane of mirror 29 must be located as shown in Figs. 3 and 4 at an angle of substantially 45° relative to the general plane of either the correcting lens 31 or the spherical mirror 30 and at a location such that the optical path length from spherical mirror 30 to correcting lens 31 is equal to the radius of curvature of surface 30a of mirror 30 so that the center of curvature of surface 30a will ultimately fall at the optical center of corrector lens 31.

In order to produce a composite fully colored and registered picture image at a viewing screen such as 32 (Fig. 1) it only remains to locate the luminous face portions of each of the kinescopes R, G and B at the object planes of their respective adjacent spherical mirrors 30 and to further align each of the image components produced on said face portions in predetermined relation with the projection axes of the system disclosed above.

While the physical and electrical characteristics of all commercial projection type kinescopes are held within very close manufacturing tolerances, the face portions of all of said kinescopes are not in precisely aligned relation with the longitudinal axes of their neck portions and furthermore, the picture images of said tubes may be produced by the electronic components thereof in slightly different locations on said face portions.

In order to properly support and align the kinescopes R, G and B in the manner stated, adjustable fixtures 47 are provided on the side wall 42 of housing 40. All of the fixtures 47 are constructed and operate in exactly the same manner and for purposes of simplifying the disclosure herein, only one of said fixtures (the one associated with kinescope B) will be described in detail.

Referring more particularly to Figs. 2, 3, 4, and 13, fixture 47 embodies a ring-like mounting plate 82 extending around the annular edge portion of opening 46 in side wall 42 of housing 40. Plate 82 is slideably mounted on a plurality of accurately machined integrally formed bosses 83 (Fig. 4) formed on side wall 42 adjacent the opening 46 therein and is held in seated relation with bosses 83 by a plurality of studs or the like 84 extending through enlarged openings 85 in plate 82 and threadedly engaged in wall 42 (Fig. 13). The studs 84 are each provided with a body portion 86 of a diameter considerably smaller than the diameter of openings 85 and an enlarged head part 87 adapted to overlie openings 85. By loosening studs 84, mounting plate 82 is free to slide on bosses 83 within the limits of the spacings between the walls of openings 85 and the body portion 86 of studs 84. The sliding adjustment of mounting plate 82 is accomplished by means of a pair of adjusting screws 88 and 89 which are threadedly engaged in plate 82. Screw 88 is disposed substantially along a vertical axis which intersects the center of opening 46 in side wall 42 and screw 89 is disposed substantially along a horizontal axis which also intersects the center of opening 46. A pair of integrally formed outwardly protruding parts 90 are provided on the side of plate 82 at a location substantially diametrically opposite screw 88 and each of parts 90 is provided with an internal bore. In one of said bores is positioned a compression spring 91 and in the other of said bores is provided a guide plunger 92 (Fig. 2) having its lower end fixed to a transversely extending plate 93 upon which the lower end of spring 91 rests. An integrally formed outwardly extending shelf 94 is provided on the side wall 42 of housing 40 against which plate 93 seats. Spring 91 exerts a downwardly directed force against plate 93 and shelf 94 thus tending to cause the mounting plate 82 to be forced upwardly when the clamping studs 84 of mounting plate 82 are loosened. When moved upwardly or downwardly, the guide plunger 92 will function to maintain the direction of movement of mounting plate 82 substantially along the above mentioned vertical axis.

In order to restrict this upwardly directed movement of mounting plate 82, the uppermost end 95 of screw 88 is positioned in engaging relation with an integrally formed outwardly directed tab part 96 on side wall 42 of housing 40. By threading screw 88 into mounting plate 82, it can be seen that an upwardly directed movement of said mounting plate 82 is effected in response to the action of the spring 91 and by threading the screw 88 out of mounting plate 82, said plate is forced downwardly against the tension of spring 91. The adjustment of mounting plate 82 in the horizontal direction is brought about in exactly the same manner by adjustment of screw 89. In this case, an adjusting apparatus identical in construction and nature to that just described is provided in the horizontal meridian (Figs. 2 and 4) to cooperate with screw 89.

The mounting plate 82 is further provided with inwardly directed bracket portions 97 (Fig. 3) in diametrically opposed relation with each other and in alignment with the vertical axis of plate 82. A socket part 98 is provided on each of the bracket portions 97 and a yoke member 99 for supporting kinescope B is pivotally mounted in said socket parts 98. Yoke 99 is provided with a pair of elongated adjusting screws 100 having identically threaded body portions threadedly engaged in the respective upper and lower edge portions thereof and each of the screws 100 is provided with a ball-like end part 101 clamped in engaging relation with their respective sockets 98. Tensioning springs 100a are interconnected between yoke 99 and mounting plate 82 (Fig. 4) to maintain the ball-like parts 101 in proper seated relation with sockets 98 at all times. Rotation of screws 100 in one direction will cause them to advance into their adjacent threaded portion of yoke 99 and cause yoke 99 to be moved outwardly in a direction away from the side wall 42 of housing 40, whereas rotation of screws 100 in the opposite direction will cause yoke 99 to move in a direction inwardly of housing 40. Furthermore, due to to the ball 101 and socket 98 connection of yoke 99 with mounting plate 82 the yoke 99 is pivotable about a vertical axis $y$ (Fig. 3). In order to provide a means for controlling the pivotal movement of yoke 99 relative to mounting plate 82, an integrally formed outwardly extending arm 102 is provided on yoke 99 in the manner shown more particularly in Fig. 4 and is contacted by an adjusting screw 103 having an integral enlarged head part 103b for hand operation thereof. Screw 103 is threadedly engaged in an outwardly extending integrally formed part 104 of the mounting plate 82. A pair of springs 105 (Figs. 2 and 4) are interconnected between yoke 99 and mounting plate 82 in the manner illustrated so as to draw the arm 102 of yoke 99 into firm engaging relation with the head 106 of screw 103. The threading of screw 103 in or out of part 104 of mounting plate 82 will cause a tilting of yoke 99 about axis $y$ and lock nuts 103a are provided to retain adjusting screw 103 in a desired adjusted position.

Yoke 99 is provided with a mounting surface 107 having a plurality of clamp screws 108 thereon for receiving the mounting plate 109 of a kinescope assembly such as illustrated in Figs. 2, 3 and 4. The kinescope assembly includes the kinescope B itself, a deflection coil 110, plate 109 and a magnetic focusing device 111 which are all clamped as an integral unit to the neck portion of kinescope B. Plate 109 is located at a predetermined distance $z$ from the spherical face portion 112 of kinescope B which distance $z$ is such as to cause the center of curvature 113 of face portion 112 to automatically lie substantially on axis $y$ of fixture 47 when the mentioned kinescope assembly is clamped to yoke 99 in the manner illustrated.

With kinescope B mounted in fixture 47 as shown and described, the aligning of said kinescope is accomplished as follows:

Kinescope B is energized by any of the well known electronic means and methods used to produce a test pattern 113a (Fig. 14) on the luminous face portion thereof. A screen 32 such as shown in Fig. 1 and Figs. 15–18 is positioned in axial alignment with the common projection axis $x$ (Fig. 1) of the device of the invention and at the coincident image plane of each of the spherical mirrors 30. A target 114 (Fig. 15) is provided on screen 32 which is of the same configuration as test pattern 113a but of a larger size proportional to the magnification factor of the optical projection system of the device.

With the test pattern 113a being produced on the face portion 112 of kinescope B, an image 115 thereof (Fig. 16) will be projected to screen 32 which image 115 will undoubtedly not be registered with target 114 nor will it be in focus at screen 32. The first step in the aligning procedure is to align the longitudinal axis of kinescope B so as to cause said axis to nearly coincide with the optical axis of spherical mirror 30 and to cause the tube face to be substantially concentric with the surface 30a of said mirror. This is accomplished by loosening the screws 84 and adjusting the mounting plate 82 a required amount in either the horizontal direction by manipulating adjusting screw 89 or in the vertical direction by manipulating adjusting screw 88 or in combinations of said vertical and horizontal directions by operation of both of said adjusting screws 88 and 89. When the longitudinal axis of kinescope B is substantially aligned with the optical axis of spherical mirror 30 the image 115 of test pattern 113a will be closely related to target 114 generally in the manner shown in Fig. 16. At this time, screws 84 are tightened and mounting plate 82 is locked to the side wall 42 of housing 40.

The test pattern image 115 is next brought into focus at screen 32 by manipulating screws 100 to move the kinescope B closer or farther away from spherical mirror 30 as required.

When the image 115 of the test pattern 113a is in focus at screen 32, the face portion 112 of kinescope B will be automatically located at the image plane of spherical mirror 30 and the center of curvature 113 of said face portion 112 will automatically fall on the pivotal axis $y$ of fixture 47 due to the above mentioned control of the distance $z$ of the kinescope assembly.

If a condition exists where the horizontal and vertical meridians of the test pattern image 115 are off axis with the horizontal and vertical meridians of the target 114 in the manner, for example, such as shown in Fig. 16, the clamp screws 108 of yoke 99 are slightly loosened and the kinescope assembly is rotated to align said meridians substantially as illustrated in Fig. 17. Screws 108 are again tightened and the precise registering of image 115 with target 114 is accomplished by tilting the kinescope about the center of curvature 113 of its spherical face portion. To raise or lower image 115 screws 100 are rotated equal amounts in opposite directions, this tilts the face portion 112 of the kinescope B upwardly or downwardly about the center of curvature 113 and because the tilting is about the center of curvature 113 this does not disturb the above mentioned focus adjustment of the kinescope. When image 115 is in a position such as shown in Fig. 18, wherein only a sidewise adjustment is required, adjusting screw 103 is actuated to tilt yoke 99 and kinescope B about the axis $y$ of fixture 47. This adjustment again does not disturb the focus of image 115 since the kinescope B is tilted about the center of curvature 113 of its face portion 112.

With the image 115 aligned and registered with target 114, all of the adjustable parts of fixture 47 are securely locked and a rigid and permanent mounting is provided for said kinescope.

The above procedure is repeated for each of the other kinescopes R and G with the same screen 32 and target 114 or by aligning and registering the images of kinescopes R and G with the above mentioned aligned image of kinescope B on screen 32.

It is particularly pointed out that test patterns and targets of other known configurations may be used to align kinescopes R, G and B and that the above described steps in the alignment procedure need not be restricted to the particular sequence given. The adjustments would normally be made in accordance with the particular requirements of each individual kinescope which might be different than those illustrated herein. The illustrations of Figs. 15–18 are given by way of example only.

With all three of the kinescopes precisely aligned as disclosed in the foregoing, simultaneous or sequential operation of said kinescopes will produce a composite precisely registered image at screen 32 principally due to the previously described precise alignment means and method for mounting the optical projection elements of the device of the invention.

From the foregoing, it will be seen that improved and simplified means and method have been provided for obtaining all the objects and advantages of the invention. However, it is apparent that many changes in the details of construction and arrangement of parts may be made by those skilled in the art without departing from the spirit of the invention as expressed in the accompanying claims. The invention is, therefore, not limited to the exact matters shown and described as only the preferred matters have been set forth by way of illustration.

Having described our invention, we claim:

1. A device of the character described comprising a housing having a pair of spaced side walls and means connecting said walls together, one of said side walls having a pair of crossed slots extending therethrough in predetermined angular relation with each other and an enlarged opening at the intersection of the axes of said slots, a pair of interfitted crossed dichroic mirrors each of a thickness less than the width of said slots and having substantially the same crossed angular relationship with each other as that of said slots, supporting means for suspending said mirrors in a given established location within said housing between said side walls thereof, said supporting means embodying a cover plate detachably mounted exteriorly on said housing over said slots in the side wall thereof and having a platform carried thereby of a shape to intimately fit within said opening in said side wall and extending inwardly of said housing through said side wall and means securing said interfitted mirrors edgewise adjacent their axis of intersection onto said platform with said axis of intersection thereof located in a predetermined fixed position relative to the axis of said platform whereby said mirrors may be removed from said housing through said crossed slots as a unit along with said plate and platform and reinserted therein and held in their initially established location within said housing between said side walls.

2. A device of the character described comprising a housing having a pair of spaced side walls and means connecting said walls together, one of said side walls having a pair of crossed slots extending therethrough in predetermined angular relation with each other and an enlarged circular opening at the intersection of the axes of said slots, a pair of interfitted crossed dichroic mirrors each of a thickness less than the width of said slots and having substantially the same crossed angular relationship with each other as that of said slots, supporting means for suspending said mirrors in a given established location within said housing between said side walls thereof, said supporting means embodying a cover plate detachably mounted exteriorly on said housing over said slots in the side wall thereof and having a cylindrical platform carried thereby in intimate interfitting relation with said circular opening in said side wall and extending inwardly of said housing through said side wall, means securing said interfitted mirrors edgewise adjacent their axis of intersection onto said platform with said axis of intersection thereof located in a predetermined fixed position relative to the axis of said cylindrical platform, partitioning means extending across the space between said side walls for enclosing said dichroic mirrors, said partitioning means embodying three apertured plate-like sections two of which are disposed at opposite sides of said dichroic mirrors with the axes of their respective apertures aligned to be substantially coincident with each other and normal to a line bisecting a selected one of the dihedral angles of said mirrors while passing through the apex of said dihedral angle, the third of said sections being disposed with the axis of its aperture in substantially coincident relation with said bisecting line, a lens element mounted in each of said apertures with its optical axis centered with the axis of its respective aperture and means for projecting an image through each of said lens elements along their respective optical axes onto said mirrors.

3. A device of the character described comprising a housing having a pair of spaced side walls and means connecting said walls together, one of said side walls having a pair of substantially right-angularly crossed slots extending therethrough and an enlarged circular opening at the intersection of the axes of said slots, a pair of dichroic mirrors each of a thickness less than the width of said slots and each having a rectangular slot extending laterally through substantially one-half the width thereof, the unslotted portion of one of said mirrors being interfitted within the respective slotted portion of the other thereof to place said mirrors in such crossed angular relation with each other as to form substantially equal dihedral angles between their adjacent face portions, supporting means for suspending said mirrors in a given established location within said housing between said side walls thereof, said supporting means embodying a cover plate detachably mounted exteriorly on said housing over said slots in the side wall thereof and having a cylindrical platform carried thereby in intimate interfitting relation with said circular opening in said side wall and extending inwardly of said housing through said side wall and means securing said interfitted mirrors edgewise adjacent their axis of intersection onto said platform with said axis of intersection thereof located in a predetermined fixed position relative to the axis of said cylindrical platform whereby said mirrors may be removed from said housing through said crossed slots as a unit along with said plate and platform and reinserted therein and held in their initially established location within said housing between said side walls.

References Cited in the file of this patent

UNITED STATES PATENTS

| | | |
|---|---|---|
| 1,299,431 | Dawson | Apr. 8, 1919 |
| 2,489,299 | Larson | Nov. 29, 1949 |
| 2,604,808 | Sachtleben | July 29, 1952 |
| 2,672,072 | Sachtleben et al. | Mar. 16, 1954 |
| 2,740,829 | Gretener | Apr. 3, 1956 |
| 2,845,480 | Bailey et al. | July 29, 1958 |